United States Patent [19]

Kirikihira et al.

[11] Patent Number: 5,811,495
[45] Date of Patent: Sep. 22, 1998

[54] ESTERAMIDE COPOLYMERS AND PRODUCTION THEREOF

[75] Inventors: Isamu Kirikihira; Hiroshi Yamakawa; Yuji Kubo, all of Mie-ken, Japan

[73] Assignee: Tosoh Corporation, Yamaguchi-Ken, Japan

[21] Appl. No.: 695,517

[22] Filed: Aug. 12, 1996

Related U.S. Application Data

[63] Continuation of Ser. No. 178,885, Jan. 7, 1994.

[30] Foreign Application Priority Data

| Jan. 8, 1993 | [JP] | Japan | 002055 |
| Jan. 8, 1993 | [JP] | Japan | 002056 |
| Mar. 25, 1993 | [JP] | Japan | 066716 |

[51] Int. Cl.$^6$ ............................ C08G 69/44; C08G 69/40
[52] U.S. Cl. .......................................... 525/434; 528/292
[58] Field of Search .................... 528/288, 292; 525/420, 425, 310, 331, 434

[56] References Cited

U.S. PATENT DOCUMENTS 4,810,770  3/1989  Greene et al. ........................ 528/289

FOREIGN PATENT DOCUMENTS

| A-0399415 | 11/1990 | European Pat. Off. . |
| A-0504058 | 9/1992 | European Pat. Off. . |
| A-0506495 | 9/1992 | European Pat. Off. . |
| 4430751 | 12/1969 | Japan . |

OTHER PUBLICATIONS

Patent Abstracts of Japan, Abstract of JP–A 4 293 923 Mar. 1993.

Patent Abstracts of Japan, Abstract of JP–A 59 217 726 Apr. 1985.

Kobayashi et al., translation of JP 44–30751, Dec. 1969.

*Primary Examiner*—Jeffrey Mullis
*Attorney, Agent, or Firm*—Sughrue, Mion, Zinn, Macpeak & Seas, PLLC

[57] ABSTRACT

Elastomeric block copolymers comprising polyether chains as soft segment in combination with aromatic polyamide chains as hard segment are disclosed, the soft and hard segments being introduced under a sequence control so as to develop excellent physical and mechanical properties. Processes for producing the elastomeric block copolymers are also disclosed.

4 Claims, 13 Drawing Sheets

ESTERAMIDE COPOLYMERS AND PRODUCTION THEREOF

This application is a continuation of Ser. No. 08/178,885 filed Jan. 7, 1994.

BACKGROUND OF THE INVENTION

1. Field of the Invention

This invention relates to a novel class of block copolymers comprising polyether chains as soft segment in combination with aromatic oligoamide chains as hard segment and also to processes for producing the block copolymers. The block copolymers according to the invention possess thermoplastic elastomeric characteristics and exhibit excellent heat resistance, cold resistance, oil resistance and processability properties. Thus, the copolymers are useful in a wide range of applications that are in need of such the excellent plastic materials, particularly in production of vehicle parts and other engineering parts and in production of lining, covering materials to be used, for example, in the electric and electronic industry.

2. Prior Art

For a long time, there have been proposed various thermoplastic elastomers for use in engineering applications. For example, the block copolymers of esteramide type containing hard segments derived from aliphatic aminocarboxylic acids, such as nylon 6 or nylon 66 unit, and soft segments derived from, for example, polytetramethylene glycol or polycaprolactone are known to have fairly good heat resistance and mechanical properties and have been employed as thermoplastic elastomer materials in production of automobile parts, electric and electronic parts, mechanical parts and other engineering parts. Hereinbelow, the term "thermoplastic elastomer" will be abbreviated as "TPE".

Because the conventional esteramide block copolymers consist of aliphatic aminocarboxylic acid units and aliphatic glycol units, they exhibit excellent moldability and formability properties. However, unfortunately, their heat resistance properties are not fully satisfactory and they show poor rubber elasticity properties, especially when they are high modulus polymers.

Also, polyester-based TPE materials have been proposed as special material of heat resistance and are under development of their use as rubber substitutes. However, it has been pointed out that the polyester-based TPE materials are poorer in dynamic heat resistance properties as compared with the conventional general-purpose crosslinked rubbers, that is the known polyester-based TPE materials present a problem in the creep properties. In fact, a certain polyester-based TPE material that is said to have the best heat resistance properties exhibits a maximum continuous service temperature of only about 100° C. or less. This would mean that the heat resistance properties of this TPE material are insufficient to permit the material to substitute itself for crosslinked rubbers.

In the circumstances, recently a variety of research works have been effected in order to provide TPE materials of improved heat resistance properties.

For example, Japanese Patent Public Disclosure (KOKAI) No. 4-293923 laid open in 1992 discloses a process for producing TPE which comprises reacting an aromatic dicarboxytic acid dichloride with polytetramethylene glycol in an amide solvent and further reacting the mixture with an aromatic diamine compound. However, the TPE product is not defined with respect to its molecular structure and the sequence of monomers is not well controlled during the process. Therefore, the aromatic polyamide units functioning as hard segment are distributed irregularly and discretely in the product TPE. This irregularity of the distribution of hard segments will present a problem of poor melt moldability. Since the process is based on solution polymerization reactions, in practice of the process, some equipments are required, for example, for isolation of the product polymer from the reacted liquor mixture. The additional initial Investment costs will add the production costs.

Japanese Patent Public Disclosure (KOKAI) No. 63-159432 laid open in 1988 describes a process for preparing polyesteramide elastomer comprising reacting an aliphatic dicarboxylic acid, such as adipic or glutaric acid, with a low molecular weight diol at an elevated temperature as high as 280°–297° C. According to the process, some of the resulting products may have a polymeric structure that does not permit the polymer to have a satisfactorily high molecular weight that leads to acceptable strength properties. Further since the product elastomer contains aliphatic polyester units as soft segment, there is a problem that the low temperature properties are adversely affected by the presence of aliphatic polyester soft segments. Since the hard segments in the elastomer comprise essentially of polymer derived from the low molecular weight diol and aromatic dicarboxylate ester, or the aromatic dicarboxylic acid itself, the sequence of monomers is not well controlled during the process. Therefore, the behavior of molten polymer is often unexpectable and may cause any moldability problem to happen.

SUMMARY OF THE INVENTION

The present invention has been accomplished in order to dissolve or substantially reduce the difficulties and problems experienced in the prior art techniques as above discussed. Accordingly, a primary object of the invention is to provide a novel esteramide copolymer material having excellent heat resistance, cold resistance, processability, strength and moldability properties.

A further object of the invention is to provide processes for producing said esteramide copolymer material.

Thus, according to the invention a class of novel esteramide copolymers are provided, which may be prepared by reacting an aromatic oligoesteramide hypothetically derived from an aromatic dicarboxylic acid compound and an aromatic aminocarboxylic acid compound, with an aliphatic diol and a dicarboxylate diester. According to the invention, processes for synthesizing such copolymers are also provided.

Figure 1:
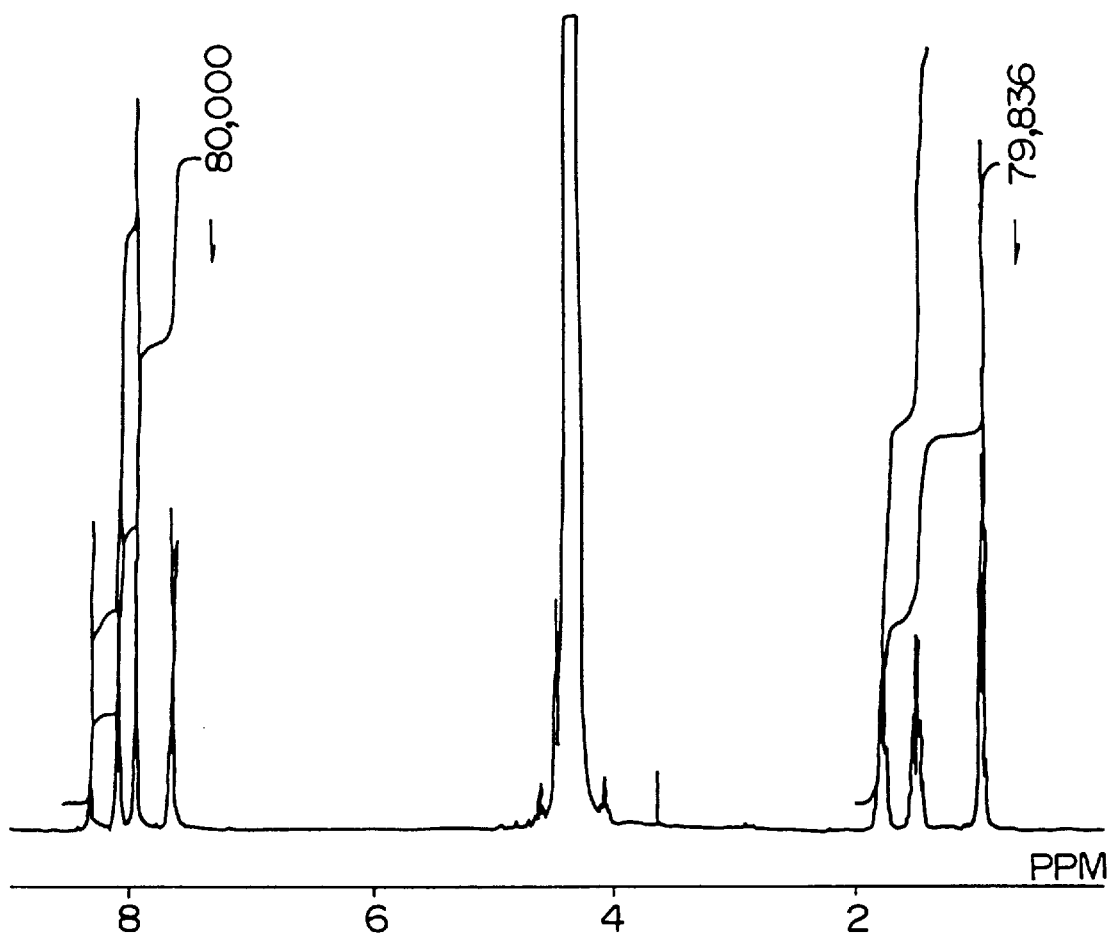
FIG. 1 is an $^1$H-NMR chart observed for the oligoesteramide copolymer (a) as prepared in Reference Example 1.
Figure 1:
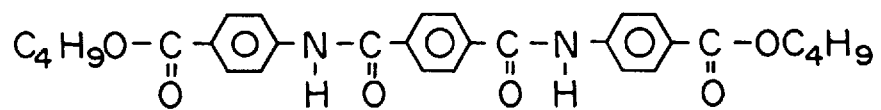

The definitions of R and R' are given in the body of the specification.

DETAILED DESCRIPTION OF THE INVENTION

The esteramide copolymer according to the invention is an elastomeric material characterized, in particular, by its excellent moldability and formability properties and comprises aromatic diamidodicarboxylate ester and poly(alkylene oxide) glycol recurring units which have been combined under a precise sequence control. Further the present copolymer shows a significantly high Z mean molecular weight, Mz, and a correspondingly high Mz/Mw ratio; these parameters being suggestive of good strength properties attained in articles produced from the copolymer.

The aromatic oligoesteramides which may be used in synthesis of the esteramide copolymers according to the present invention are hypothetically derived from aromatic dicarboxylic acid compounds and aromatic aminocarboxylic acid compounds. For example, the aromatic oligoesteramide may be prepared by reacting an aromatic dicarboxylic acid dichloride with an aromatic aminocarboxylate ester in a molar ratio of from 1:2 to 1:5, preferably from 1:2 to 1:3, at a temperature of not less than −20° C., preferably in the range of 0° to 30° C.

Examples of the aromatic diamidodicarboxylate diesters which may be used are represented by the following general formula:

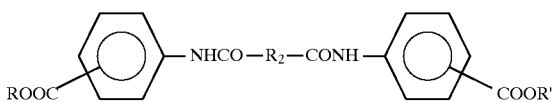

where R and R' each represent independently an aliphatic alkyl group having 1–13 carbon atoms, and $R_2$ represents a divalent aromatic residue. Some particular examples of the aromatic diamidodicarboxylate diesters are listed in FIG. 12 attached hereto, in which R and R' are as defined above. Other aromatic diamidodicarboxylate diester compounds may be used.

According to one embodiment of the invention, the novel esteramide copolymer may be prepared by reacting an aromatic oligoesteramide as exemplified above with an aliphatic diol in the molten state, or by reacting such an oligoesteramide with an aliphatic diol and a dicarboxylate diester in the molten state. That is the esteramide copolymer may be prepared by subjecting the starting materials directly to condensation polymerization in the presence of catalyst. In more detail, the condensation polymerization process may be effected through ester exchange reaction of the starting materials under an inert gas stream, e.g., $N_2$ stream, at a temperature of about 150°–240° C. and at or near atmospheric pressure in the presence of an esterification catalyst while removing an alcohol eliminated by the reaction, followed by a further condensation polymerization at a reduced pressure of 5 mm Hg or lower and a temperature of about 150°–300° C.

Examples of the esterification catalysts which may be employed in the above melt reaction process include titanium alkoxides, such as tetramethyl, tetraethyl, tetra(n-propyl), tetraisopropyl and tetrabutyl titanates; dialkyl tin compounds, such as di-(n-butyl) tin dilaurate, di-(n-butyl) tin oxide and di-(n-butyl) tin diacetate; and oxides, acetate salts and sulfate salts of metals, such as magnesium, calcium, germanium, zinc, antimony, etc. Conveniently titanium alkoxides are employed. The catalyst is generally employed in a proportion of about 0.0005–1.0% by weight on the total weight of the monomers charged. The catalyst may be used at levels outside this range.

Examples of the aromatic aminocarboxylic acid compounds which may be used for preparation of the aromatic oligoesteramides include alkyl (e.g., methyl, ethyl, propyl and butyl) esters of aminocarboxylic acids: for example, aminobenzoic acids, such as 4-amino benzoic acid and 3-amino benzoic acid; biphenyl aminocarboxylic acids, such as 4-amino-4'-carboxy biphenyl, 4-amino-4'-carboxy biphenyl ether, 4-amino-4'-carboxy biphenyl sulfide, and 4-amino-4'-carboxy biphenyl sulfone; aminocarboxy phenones such as 3-amino-3'-carboxy benzophenone, and 4-amino-4'-carboxyphenone; and aminocarboxy naphthalenes, such as 1-amino-4-carboxy naphthalene, and 2-amino-6-carboxy naphthalene.

Preferred examples of the aromatic dicarboxylic acid compounds which may be employed include dihalides, typically dichlorides, of aromatic dicarboxylic acids: for example, phthalic acids, such as terephthalic and isophthalic acids; biphenyl dicarboxylic acids, such as 4,4'-dicarboxy biphenyl, 4,4'-dicarboxy biphenyl ether, 4,4'-dicarboxy biphenyl sulfide, and 4,4'-dicarboxy biphenyl sulfone; dicarboxy phenones, such as 3,3'-dicarboxy benzophenone, 4,4'-dicarboxy benzophenone, and 1,2-bis(4-carboxy phenonoxy) ethane; and dicarboxy naphthalenes, such as 1,4-dicarboxy naphthalene and 2,6-dicarboxy naphthalene.

During the process for synthesizing the aromatic oligoesteramide, the reaction between the dicarboxylic acid dichloride and the aminocarboxylic acid generates hydrogen chloride. The eliminated hydrogen chloride may be removed effectively by means of scavenger such as N,N-dimethyl aniline, N,N'-diethyl aniline, N,N'-dimethyl morpholine, pyridine and the like. The scavenger is preferably employed in a quantity of about 2–3 moles per mole of the dicarboxylic acid dichloride used.

The proportion of the aromatic oligoesteramide that is copolymerized and introduced into the esteramide copolymer product should be in the range of about 10–90%, preferably 15–85%, by weight in view of the desirable heat resistance, mechanical strength and moldability properties attained in the copolymer.

Examples of the poly(alkylene oxide) glycols which may be used in the invention include poly(ethylene oxide) glycol, poly(propylene oxide) glycol, poly(tetramethylene oxide) glycol, poly(hexamethylene oxide) glycol, ethylene oxide/propylene oxide copolymer, ethylene oxide/tetrahydrofuran copolymer, poly(propylene oxide) glycol/ethylene oxide adduct polymer; block copolymer; such as poly(ethylene oxide)-poly(tetramethylene oxide) diblock copolymer or poly(ethylene oxide)-poly(tetramethylene oxide)-poly(ethylene oxide) triblock copolymer. These may be used alone or as a mixture of two or more of the members.

The number average molecular weight of the poly(alkylene oxide) glycols used in the invention is from about 250 to about 10,000, preferably from 500 to 4,000, though the optimum value will vary depending upon some factors, such as the chemical structure, the nature of the aromatic oligoester and the relative proportions of materials to be copolymerized. In particular, where an elastomer having excellent low-temperature properties is desired, preferably a poly(tetramethylene oxide) glycol having a number average molecular weight of 500–2,000, more preferably 500–1,600, is employed. If the number average molecular weight of poly(alkylene oxide) glycol is less than about 250, poor moldability properties will occur in the product copolymer and the melting point will rise to such an extent that the operation of the melt reaction becomes difficult. On the other hand, if the number average molecular weight is higher than about 10,000, a serious phase separation of polymer will take place during the polymerization and will give rise to a poor yield of the product copolymer.

The relative proportion of the poly(alkylene oxide) glycol copolymerized in the product copolymer should be in the range of about 90 - 10%, preferably 85 - 15%, by weight in view of the desirable heat resistance, mechanical strength and moldability properties attained in the product copolymer. If the proportion of the glycol chain in the product copolymer exceeds about 90% by weight, then the crystallizability of the product copolymer will become poor as well as the moldability will degrade seriously. Where the proportion is less than about 10% by weight, the product polymer will be unsatisfactory with respect to the flexibility and rubber elasticity properties.

In practice of the invention, the molar ratio of the aromatic diamidodicarboxylate ester (a) to the poly(alkylene oxide) glycol (b) that are charged in the reaction system ranges usually from 0.8:1.0 to 1.0:0.8, preferably from 0.95:1.0 to 1.0:0.95, and more preferably from 0.995:1.0 to 1.0:0.995.

According to another embodiment of the present invention, a high molecular weight elastomer having excellent strength properties may be prepared by reacting the above-mentioned ester compound (a), glycol (b) and dicarboxylate diester (c) together in the presence of an organic solvent so as to prepare a prepolymer of a number average molecular weight of less than about 12,000—, removing the solvent from the reacted mixture, and then bulk polymerizing the residue in the molten state. In more detail, first, the solvent, aromatic diamidodicarboxylate ester and poly(alkylene oxide) glycol are charged together into a reactor, then a polymerization catalyst is added, and the reaction mixture is stirred to give a homogeneous reaction mixture, which is heated to an appropriate reaction temperature and allowed to react at or near atmospheric pressure for a period of time to give the prepolymer of an Mn of less than about 12,000. The reaction temperature is in the range of about 140°–220' C., preferably 160°–210° C. and more preferably 170°–210° C., and the reaction time is in the range of about 0.5–6 hours, preferably 0.5–3 hours and more preferably 0.5–2 hours. The organic solvent is used usually in a quantity of about 1–50%, preferably 1–40%, by weight of the total weight of the aromatic diamidodicarboxylate ester compound (a), poly(alkylene oxide) glycol (b) and dicarboxylate diester (c) charged in the reactor.

From the hot reaction mixture comprising the resultant prepolymer, the organic solvent is slowly evaporated off over a period of about 30–90 minutes at a reduced pressure. The solvent-depleted reaction mixture is then transferred to the bulk polymerization phase in the molten state. This melt polymerization is effected at a reduced pressure of about 0.1–2 mm Hg and at a temperature of about 210°–270° C., preferably 220°–260° C., for a period of about 1–6 hours, preferably 1–4 hours, to give a desired high molecular weight copolymer. The reaction temperature may be suitably varied depending upon the nature of poly(alkylene oxide) glycol used or the chemical composition of copolymer to be produced.

The organic solvent used in the above process according to the invention should be capable of dissolving the ester compound (a); the esteramide copolymer resulting from the reactions between the ester compound (a), glycol (b) and- dicarboxylate ester (c); and/or the dicarboxylate-ester, to an extent of at least about 0.01 g/per ml at 25° C. and should have a boiling point in the range of about 140°–290° C. at atmospheric pressure. Preferred examples of the solvent include organic amide solvents, in particular, N-methyl-2-pyrrolidone; N-acetyl-2-pyrrolidone; N,N'-dimethyl formamide; N,N'-dimethyl acetamide; N,N'-diethyl acetamide; N,N'-dimethyl propionic acid amide; N,N'-diethyl propionic acid amide; tetramethyl urea; tetraethyl urea; hexamethylphosphor triamide; N-methyl caprolactam and the like. Other solvents may also be employed, for example, methylene chloride, chloroform, 1,2-dichloroethane, tetrahydrofuran, diethyl ether, dioxane, benzene, toluene, chlorobenzene, o-dichlorobenzene and the like.

Examples of the dicarboxylate diesters which may be used include diesters of phthalic acids, such as of terephthalic and isophthalic acids; diesters of aliphatic carboxylic acids, such as of succinic, glutaric and adipic acids; and the like. The proportion of the carboxylate diester introduced into the product copolymer preferably ranges from 0% to 20% by weight.

The melt polymerization of the aromatic oligoesteramide, poly(alkylene oxide) glycol and dicarboxylate diester reactants according to the present invention produces an esteramide copolymer having aromatic esteramide-based hard segments and exhibiting excellent hot resistance, cold resistance, oil resistance, processability, strength and moldability properties. The product esteramide copolymer has a number average molecular weight of about 5,000–500,000 and consists of:

10% to 90% by weight of aromatic oligoesteramide chains of formula (I):

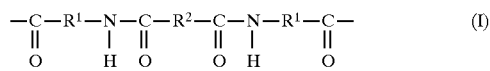

where $R^1$ and $R^2$, each, represents independently a divalent aromatic residue having from 6 to 30 carbon atoms; 90% to 10% by weight of poly(alkylene oxide) glycol chains having a number average molecular weight in the range of about 250–10,000; and 0% to 20% by weight of dicarboxylic units.

Preferably, the number average molecular weight of the esteramide copolymer ranges from 5,000 to 500,000. If the number average molecular weight is less than about 5,000, the copolymer product shows poor mechanical properties. Where the molecular weight is greater than about 500,000, any undesirable processability problem tends to occur.

In an aspect of the invention, the terminal groups of the poly(alkylene oxide) glycol are substituted with an aromatic aminocarboxylic acid compound. This substitution reaction may be effected, for example, by subjecting an aromatic aminocarboxylate ester and a poly(alkylene oxide) glycol in a molar ratio of about 2:1 to ester exchange reaction in the presence of an ester exchange catalyst under a nitrogen stream at a near atmospheric pressure and a temperature of about 150°–240° C., while removing the eliminated alcohol, and allowing the reaction mixture to further react at about 150°–300° C. and a reduced pressure of not greater than about 5 mm Hg.

The poly(alkylene oxide) glycol substituted at the terminals with the aromatic aminocarboxylic acid may be reacted with an aromatic dicarboxylic acid dichloride in an organic solvent at a temperature of greater than about −20° C., preferably in the range of 0°–100° C., to give a desired esteramide copolymer. Since during this reaction, hydrogen chloride is generated, preferably any scavenger is employed.

Preferably, any suitable stabilizer is added during or after the polymerization in order to improve the thermal aging resistance of the product esteramide copolymer. Examples of the stabilizers for this purpose include phosphor stabilizers, such as phosphate esters, phosphite esters and hypophosphite esters, for example dialkyl pentaerithritol diphosphites, dialkyl bisphenol A diphosphites, tris(2,4-di-ti-butylphenyl) phosphite and the like; hindered phenolic stabilizers; thioether stabilizers, dithioacid-salt stabilizers, mercaptobenzimidasolic stabilizers, thiocarbanilide stabilizers, thiodipropionate esters and other sulfur-containing stabilizers; and tin-containing stabilizers, such as tin maleate and dibutyl tin dioxide. The amount of stabilizer added ranges preferably from about 0.01 to 2.0 parts by weight per hundred parts of the esteramide copolymer.

Further, a lubricant may be advantageously added to the esteramide copolymer in order to improve the moldability properties. Examples of the lubricants which may be used include stearate salts such as of calcium, barium and aluminium, stearate esters, silicone oils, waxes, and ethylene bis-stearyl amide. Usually, the lubricant is preferably added in a proportion of about 0.05–5.0 parts by weight per hundred parts by weight of the esteramide copolymer.

If necessary, any known additive may be added to the present esteramide copolymer. Examples of the additives include pigments, dyes, inorganic reinforcing agents, plasticizers, hindered amine light stabilizers, UV absorbing agents, foaming agents, epoxy compounds, isocyanate compounds and other conventional additives.

EXAMPLE

The invention will be further described with reference to the following Examples. The apparatuses and methods for analyzing the aromatic oligoesteramides and esteramide copolymers obtained in the Examples are listed below:

(1) $^1$H-NMR spectrometry was conducted using JNM-Model GSX270 manufactured by Jeol Ltd.,; measured in hexafluoroisopropanol at 45° C. after 400 times integrated.

(2) $^{13}$C-NMR spectrometry was conducted using JNM-Model GSX270 manufactured by Jeol Ltd.,; measured in hexafluoroisopropanol at 45° C. after 18,000 times integrated.

(3) IR spectrometry was conducted by the KBr tablet method using Model 270 - 30 manufactured by HITACHI.

(4) Dynamic viscoelastic behavior was measured at a frequency of 11 Hz at a heating rate of 2° C./min over a temperature range from −100° C. to 300° C. using DVE-V4 FT Rheospectra manufactured by Rheology Co., Ltd.

(5) Glass transition temperature (Tg) and melting point (Tm) were determined using DSC 200 manufactured by Seiko Electronics Industry at a heating rate of 10° C./min over a temperature range of from −100° C. to 300° C.

(6) Thermal decomposition temperature (Td) was determined using TG-DTA200 manufactured by Seiko at a heating speed of 20°/min over a temperature range of from 50° C. to 650° C.

(7) GPC measurement was conducted using CP-8000 data processing computer manufactured by TOSOH, a polystyrene gelcolumn G2000H8, GMHXL manufactured by TOSOH was used; determined at a flow rate of 1.0 ml/min using an eluate comprising N-methyl-2-pyrrolidone containing 20 mM lithium chloride at a column temperature of 40° C.

(8) Elementary analysis was carried out in Model 1106 manufactured by Carlo-Eval Co. using the dynamic combustion method to analyze into carbon, hydrogen and nitrogen.

(9) Hardness was determined on a 1 mm thick pressed sheet using Micro Rubber Hardness Meter manufactured by KOHBUNSHI KEIKI Co.

(10) Mechanical properties (breaking strength and elongation at break) were determined on a 1 mm thick pressed sheet using Autograph DSC-100 produced by Shimazu Manufacturing Co.

REFERENCE EXAMPLE 1

Synthesis of Aromatic Oligoesteramide (a)

Figure 2:
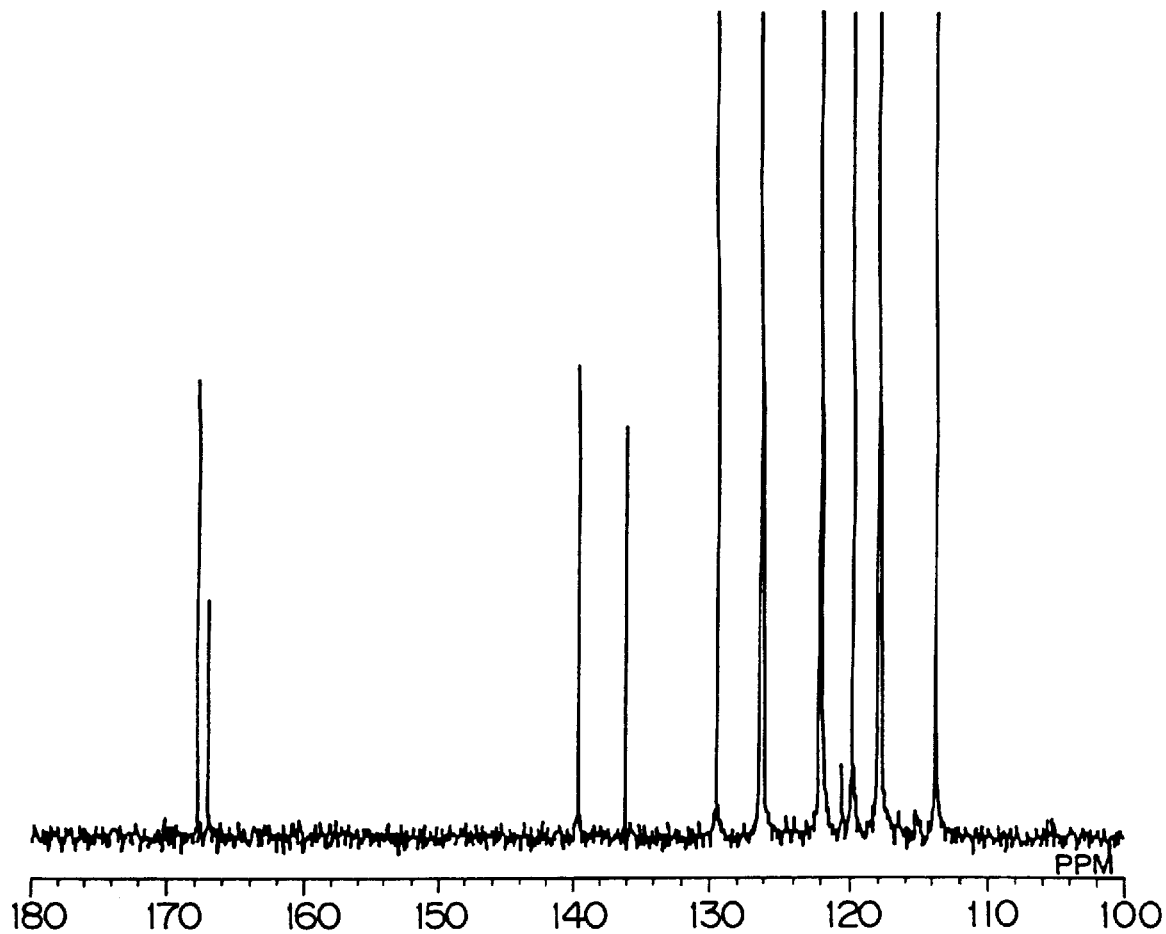
FIG. 2 is a $^{13}$C-NMR chart observed for the oligoesteramide copolymer (a) as prepared in Reference Example 1.
Figure 2:
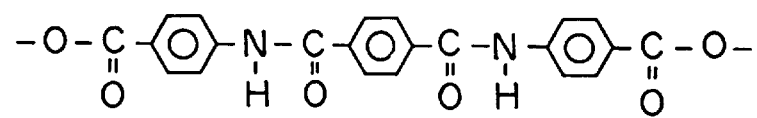
Figure 3:
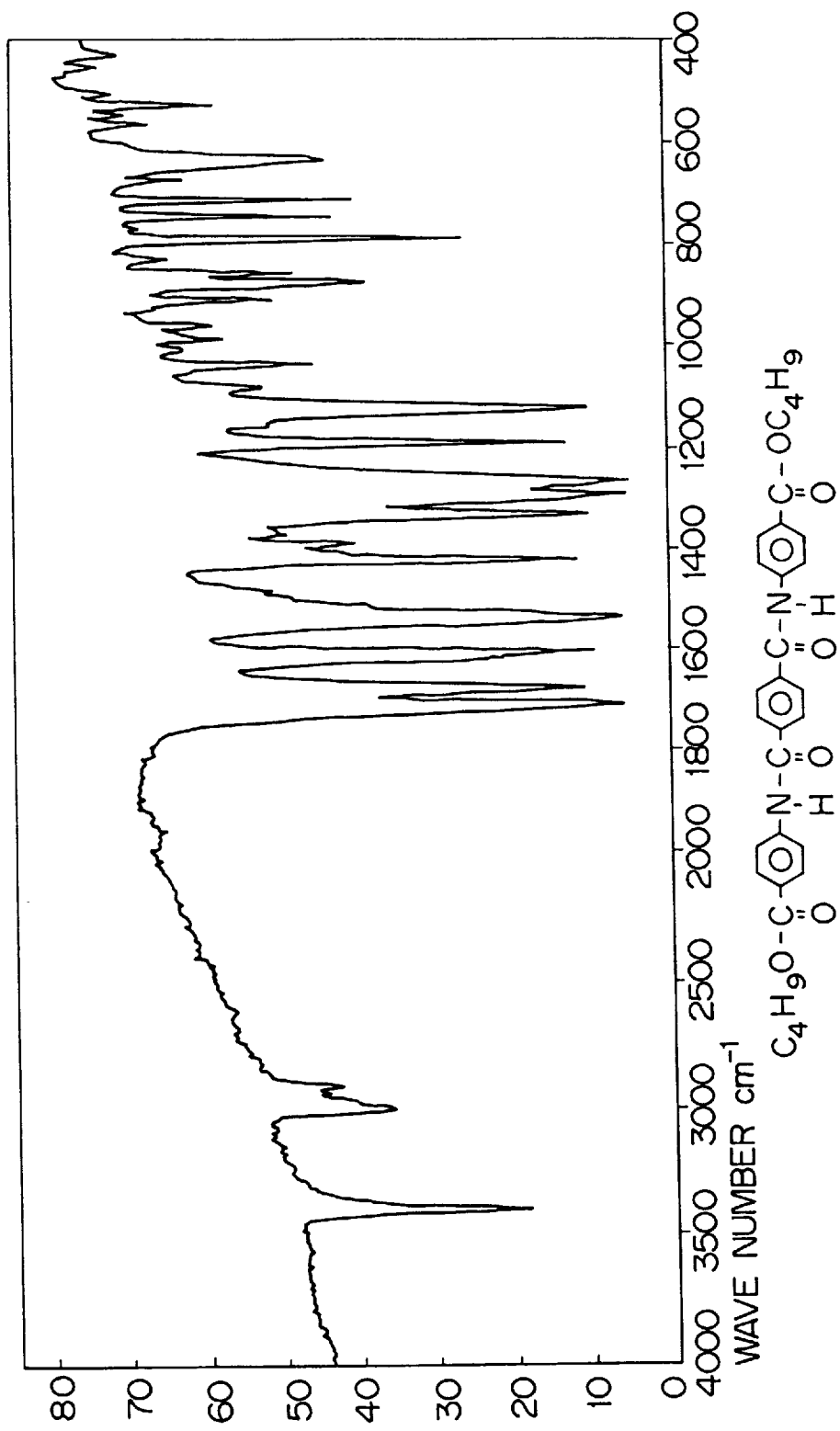
FIG. 3 is an IR spectrometry chart observed for the oligoesteramide copolymer (a) as prepared in Reference Example 1.

A 1-liter capacity four-neck flask provided with a nitrogen inlet pipe and a magnetic stirrer blade was thoroughly dried, flushed with nitrogen gas, and charged with 99.65 g (0.5 moles) of butyl aminobenzoate (BAB) and 200 ml of dehydrated N-methyl-2-pyrrolidone (NMP). The BAB was dissolved in the NMP and the mixture was ice-cooled (at 0°–5° C.). Thereafter, a solution of 40.60 g (0.2 moles) terephthalic acid dichloride (TPC) dissolved in 200 ml NMP was added to the cooled mixture in the flask. The mixture was allowed to react at 0°–5° C. for 6 hours and subsequently at room temperature for one day with stirring. The reacted mixture was then treated with methanol to precipitate the reaction product, which was then washed with acetone and thereafter recrystallized from an NMP/toluene solution. An oligoesteramide product (a) having a melting point of 305° C. was recovered at a yield of 78.51 g (76%). The $^1$H-NMR, $^{13}$C-NMR and IR spectrometry charts determined on the product (a) are shown in FIGS. 1, 2 and 3, respectively.

REFERENCE EXAMPLE 2

Synthesis of Aromatic Oligoesteramide (b)

A 1-liter capacity four-neck flask provided with a nitrogen inlet pipe and a magnetic stirrer blade was thoroughly dried, flushed with nitrogen gas and then charged with 96.65 g (0.5 moles) of BAB and 200 ml of dehydrated NMP. After dissolving the BAB in the NMP, the mixture was ice-cooled (at 0°–5° C.). Thereafter, a solution of 40.61 g (0.2 moles) isophthalic acid dichloride dissolved in 100 ml NMP was added to the mixture in the flask. The mixture was allowed to react at 0°–5° C. for 6 hours and subsequently at room temperature for one day with stirring. The reacted mixture was then treated with methanol to precipitate the reaction product, which was then washed with acetone and thereafter recrystallized from an NMP/toluene solution. An oligoesteramide product (b) having a melting point of 194° C. was recovered at a yield of 45.57 g (44%).

REFERENCE EXAMPLE 3

Synthesis of Aromatic Oligoesteramide (c)

A 10-liter capacity four-neck flask provided with a nitrogen inlet pipe and a magnetic stirrer blade was thoroughly dried and flushed with nitrogen gas, and then charged with 1,321.5 g (8.0 moles) of ethyl aminobenzoate (EAB) and 4 liters of dehydrated NMP. After dissolving the EAB in the NMP, with stirring a solution of 812.1 g (4.0 moles) terephthalic acid dichloride (TPC) dissolved in b liters NMP was added dropwise and then 638.2 g (8.0 moles) of pyridine was introduced. The mixture was allowed to react at room temperature for one day. The resulting product was washed with pyridine and with acetone and thereafter recrystallized from an NMP/toluene solution. An oligoesteramide product (c) having a melting point of 358° C. was recovered at a yield of 1,436.7 g (79%).

EXAMPLE 1

A 500-ml capacity four-neck separable flask provided with a nitrogen inlet pipe, a thermal sensor, a magnetic stirrer blade and a distillation tube was charged with 15.50 g (0.03 moles) of the oligoesteramide product (a) from Reference Example 1, 30.28 g (0.03 moles) polytetramethylene glycol (PTMG: number average molecular weight, Mn, =1,009) and 0.05 g IRGANOX1010 (a phenolic stabilizer available from Ciba-Geigy AG). The interior gas space of the reaction vessel was thoroughly replaced with nitrogen gas and then 0.10 g of tetrabutyl titanate catalyst was introduced. Under a nitrogen stream, the temperature of the reaction mixture was raised from room temperature upto 240° C. over a period of 60 minutes with stirring and a calculated amount of eliminated butanol was permitted to flow out in 3 hours. Then the mixture was allowed to react at 240° C. and a reduced pressure of 1 mm Hg for a further 2 hours. The temperature was raised to 280° C. and the reaction was allowed to proceed for a further one hour.

Figure 4:
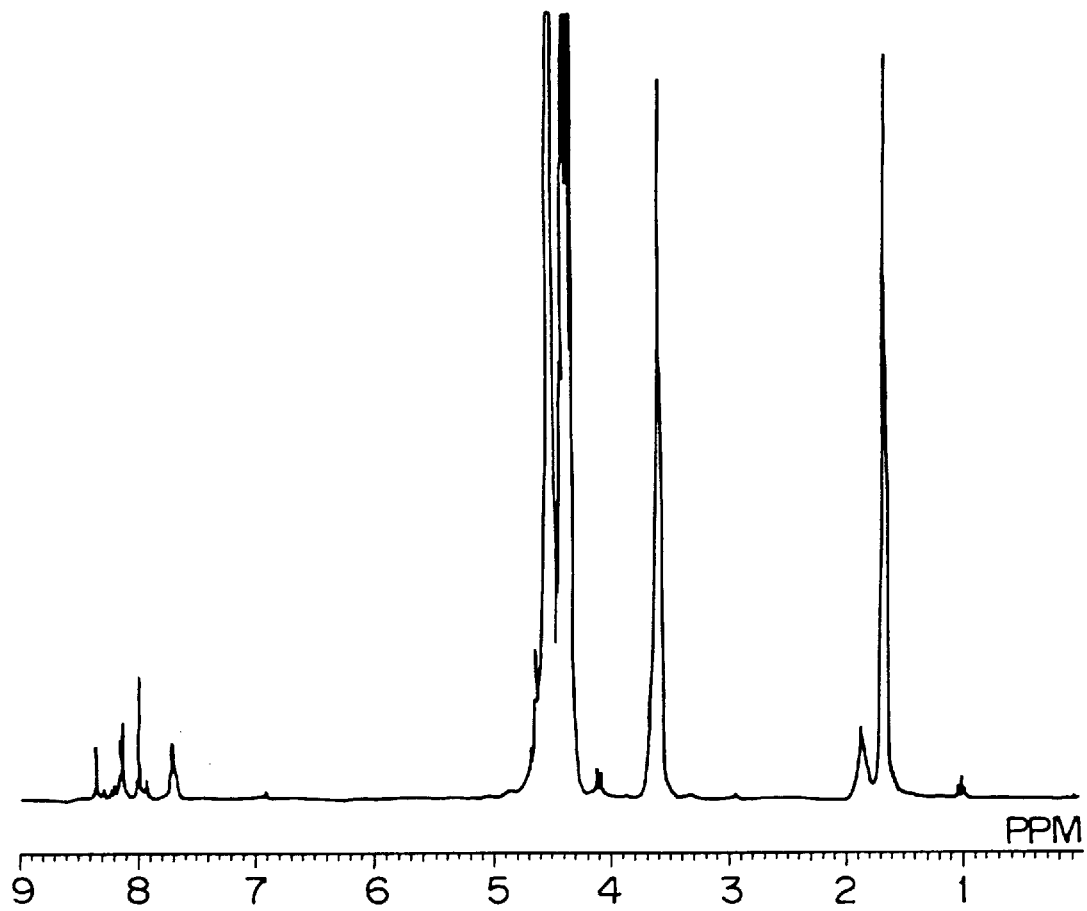
FIG. 4 is an $^1$H-NMR chart for the esteramide copolymer product of Example 1.
Figure 5:
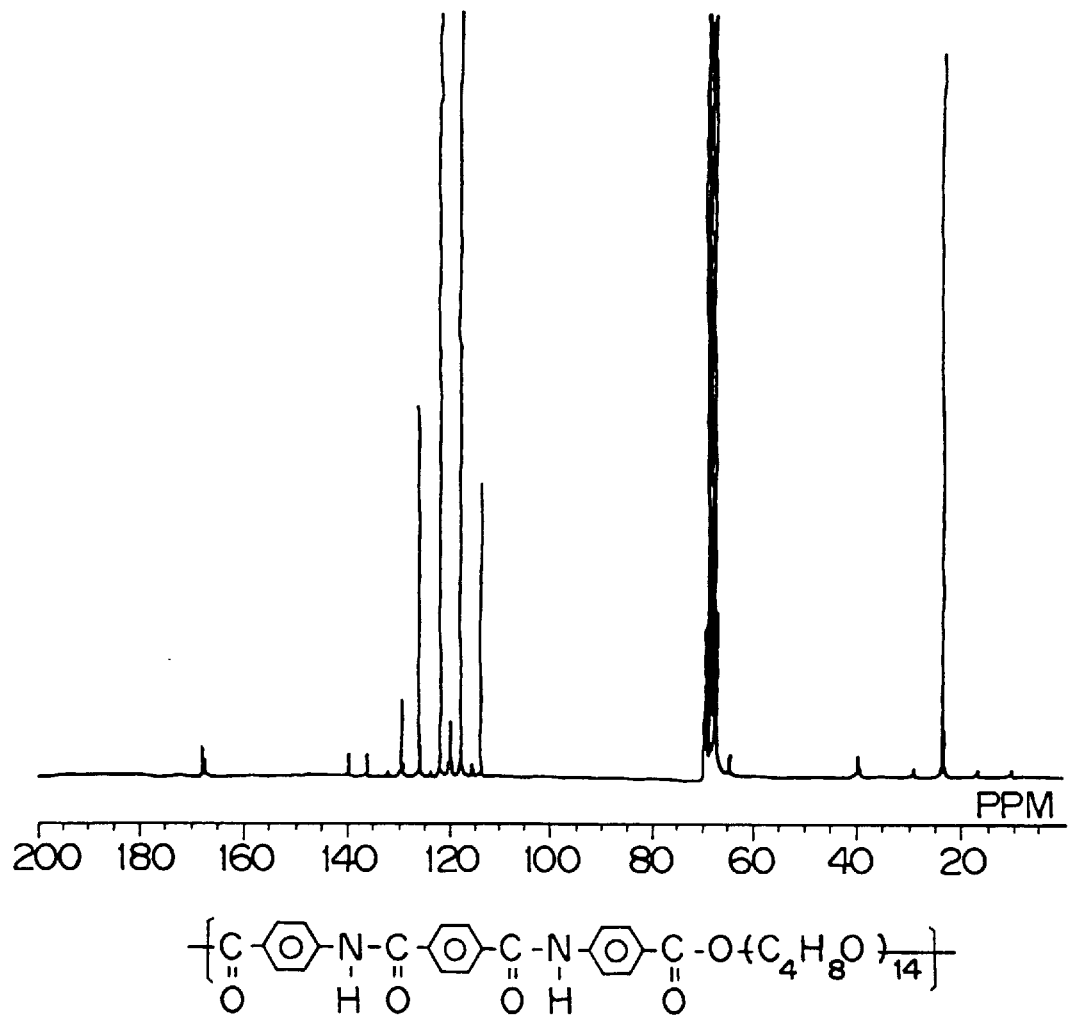
FIG. 5 is a $^{13}$C-NMR chart for the esteramide copolymer product of Example 1.
Figure 6:
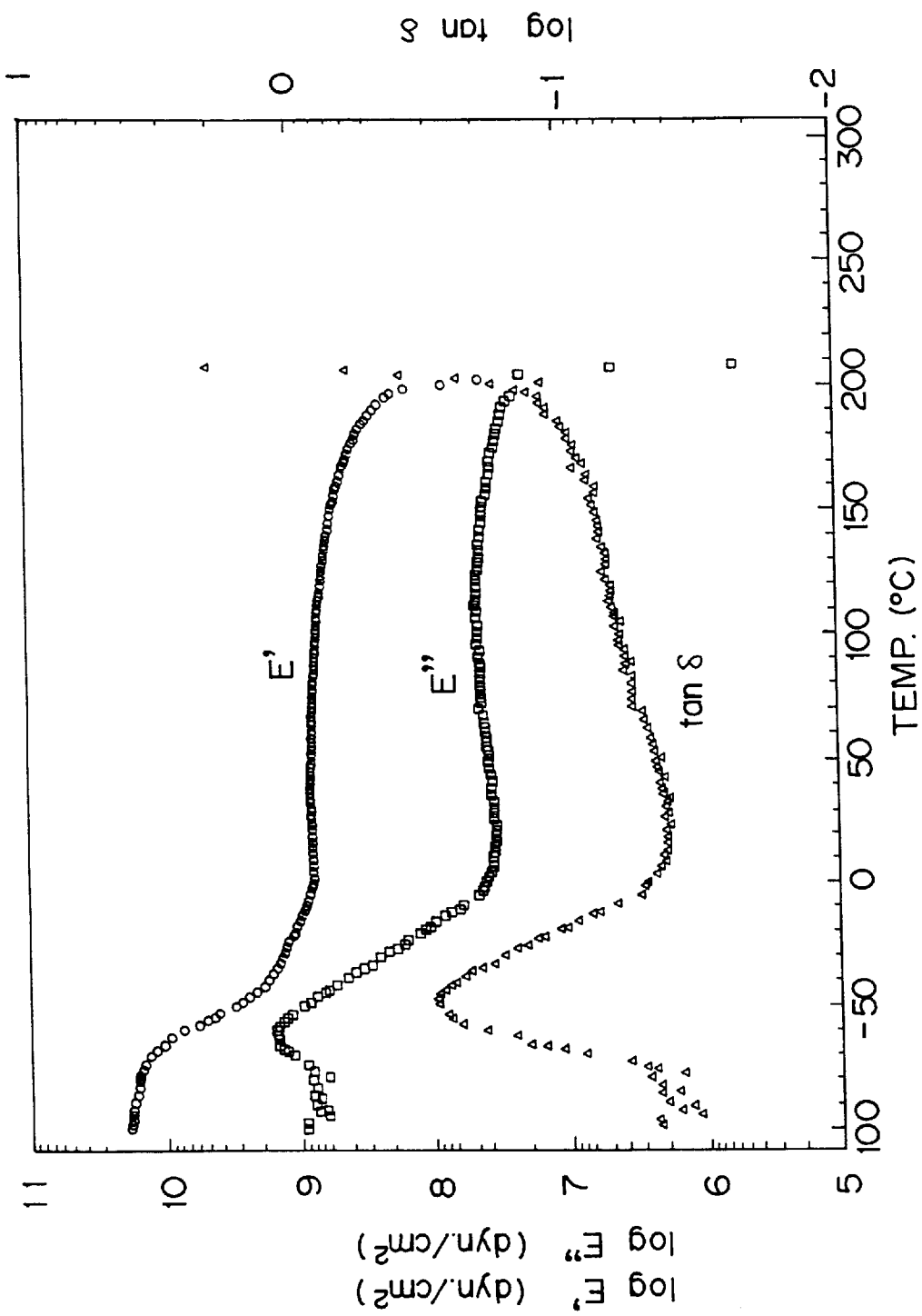
FIG. 6 a graph showing the kinetic viscoelastic behavior of the esteramide copolymer product of Example 1 over a wide temperature range of −100° C. to 300° C.

An esteramide copolymer product showing good rubber elasticity was obtained at a yield of 38.22 g (92%). The $^1$H-NMR and $^{13}$C-NMR charts and kinetic viscoelasticity characteristics determined on the product are shown in FIGS. 4, 5 and 6, respectively. The date of molecular weight, glass transition temperature (Tg), melting point (Tm) and elemental analysis of the polymer are set forth in Table 1.

EXAMPLE 2

A 500-ml capacity four-neck separable flask provided with a nitrogen inlet pipe, a thermal sensor, a magnetic stirrer blade and a distillation tube was charged with 15.05 g (0.03 moles) of the oligoesteramide (a) from Reference Example 1, 60.35 g (0.06 moles) PTMG (Mn =1,009), 5.83 g (0.03 moles) dimethyl terephthalate and 0.08 g IRGANOX1010. After thorough flushing with nitrogen gas, 0.10 g tetrabutyl titanate catalyst was introduced. Under a nitrogen stream, the temperature of the reaction mixture was raised from room temperature upto 240° C. over a period of 60 minutes with stirring and a calculated amount of eliminated butanol was permitted to flow out in 3 hours. Then the mixture was allowed to react at 240° C. and a reduced pressure of 1 mm Hg for a further 2 hours. The temperature was raised to 280° C. and the reaction was allowed to proceed for a further one hour.

An esteramide copolymer product showing good rubber elasticity was obtained at a yield of 72.04 g (95%). The data of molecular weight, Tg, Tm and elementary analysis of the polymer are set forth in Table 1.

EXAMPLE 3

A 500-ml capacity four-neck separable flask provided with a nitrogen inlet pipe, a thermal sensor, a magnetic stirrer blade and a distillation tube was charged with 15.50 g (0.03 moles) of the oligoesteramide product (a) from Reference Example 1, 60.44 g (0.03 moles) PTMG (Mn =2,014) and 0.08 g IRGANOX1010. After thorough flushing with nitrogen gas, 0.1 g tetrabutyl titanate catalyst was introduced. Under a nitrogen stream, the temperature of the reaction mixture was raised from room temperature upto 230° C. over a period of 60 minutes with stirring and a calculated amount of eliminated butanol was permitted to flow out in 3 hours. Then the mixture was allowed to react at 230° C. and a reduced pressure of 1mm Hg for a further 2 hours. An esteramide copolymer product showing good rubber elasticity was obtained at a yield of 67.63 g (94%). The data of molecular weight, Tg, Tm and elementary analysis are set forth in Table 1.

EXAMPLE 4

A 500-ml capacity four-neck separable flask provided with a nitrogen inlet pipe, a thermal sensor, a magnetic stirrer blade and a distillation tube was charged with 15 51 g (0.03 moles) of the oligoesteramide product (b) from Reference Example 2, 130.28 g (0.03 moles) PTMG (Mn =1,009) and 0.05 g IRGANOX1010. After thorough flushing with nitrogen gas, 0.10 g tetrabutyl titanate catalyst was introduced. Under a nitrogen stream, the temperature of the reaction mixture was raised from room temperature upto 240° C. over a period of 60 minutes with stirring and a calculated amount of eliminated butanol was permitted to flow out in 3 hours. Then the mixture was allowed to react at 240° C. and a reduced pressure of 1 mm Hg for a further 2 hours. The temperature was raised to 280° C. and the reaction was allowed to proceed for a further one hour.

An esteramide copolymer product showing good rubber elasticity was obtained at a yield of 38.57 g (93%). The data of molecular weight, Tg, Tm and elementary analysis of the polymer are set forth in Table 1.

EXAMPLE 5

A 500 ml-capacity four-neck separable flask provided with a nitrogen inlet pipe, a thermal sensor, a magnetic stirrer blade and a distillation tube was charged with 50.48 g (0.05 moles) polytetramethylene glycol (PTMG; Mn =1,009) and 19.35 g (0.10 mole) butyl aminobenzoate (BAB) and thoroughly flushed with nitrogen gas. Then, 0.08 g tetrabutyl titanate catalyst was introduced. Under a nitrogen stream, the temperature of the reaction mixture was raised from room temperature upto 200° C. over a period of 60 minutes with stirring. A calculated amount of eliminated butanol was permitted to flow out in 2 hours. Then the mixture was allowed to react at 230° C. and a reduced pressure of 1 mm Hg for a further 2 hours.

Thereafter, 100 ml N-methyl-2-pyrrolidone (NMP) was added to to the mixture, which was then maintained ice-cooled. To the cooled mixture, a solution of 10.15 g (0.05 moles) terephthalic acid chloride (TPC) in 100 ml NMP was added dropwise. Also, 8.55 g (0.11 moles) pyridine was added as a hydrogen chloride-scavenger to the mixture which was then allowed to polymerize for one day at room temperature.

After polymerization, the resulting polymer product was precipitated using a bulk of methanol, filtered and dried to given an esteramide copolymer showing good rubber elasticity. The yield was 58.12 g (85%).

Figure 7:
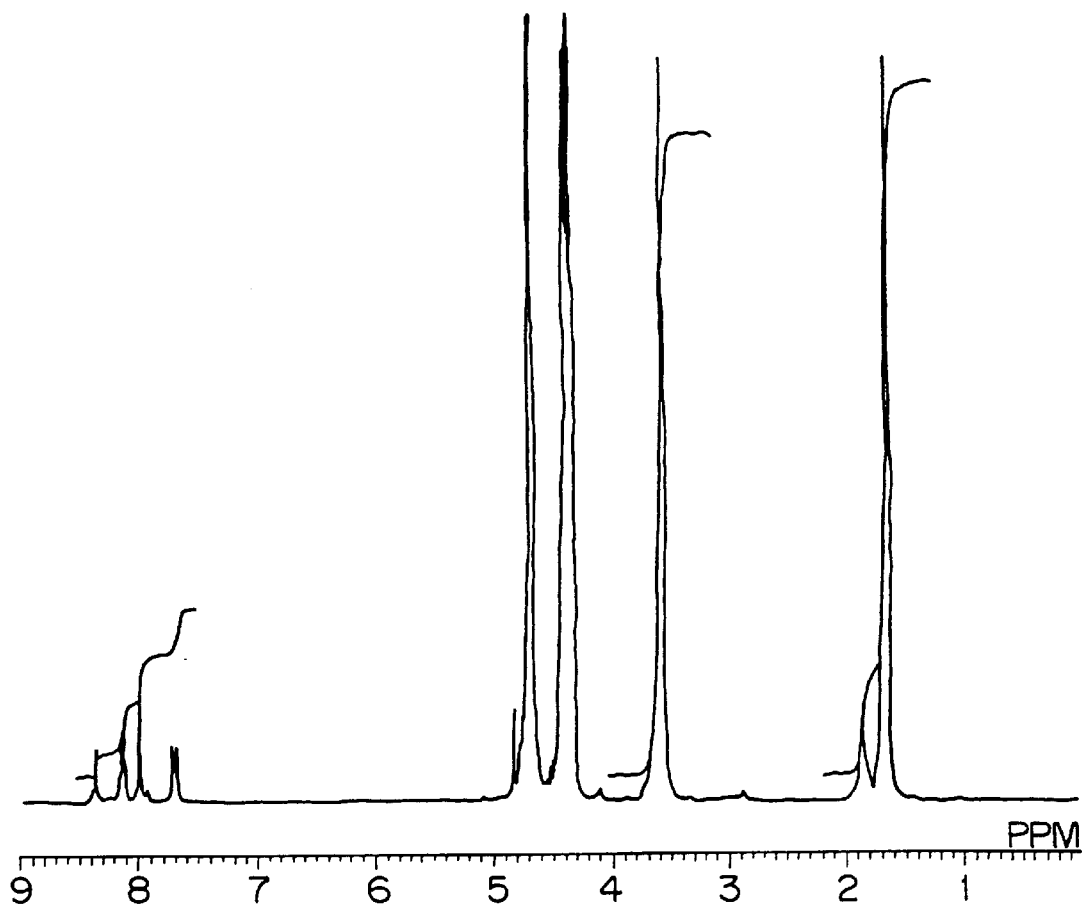
FIG. 7 is an $^1$H-NMR chart for the esteramide copolymer product of Example 5.
Figure 8:
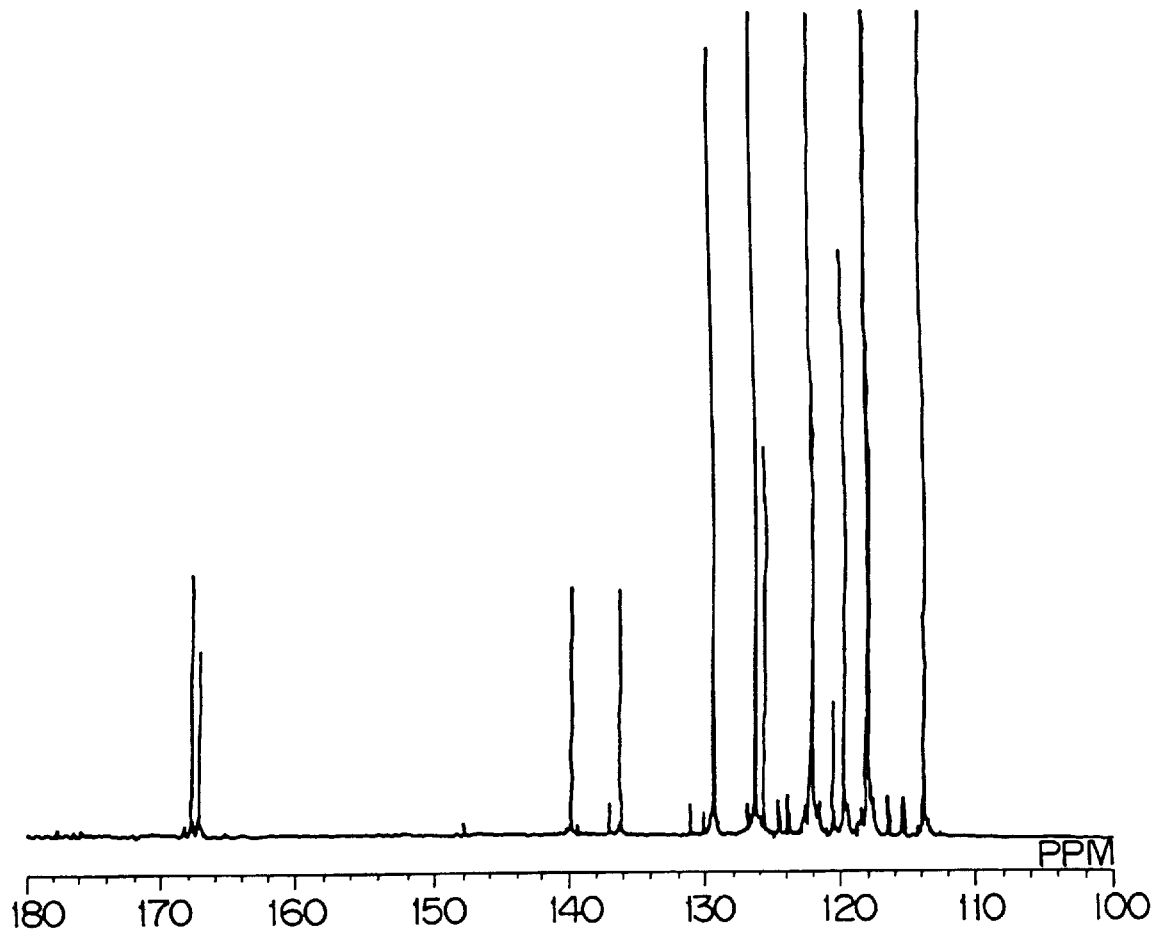
FIG. 8 is a $^{13}$C-NMR chart for the esteramide copolymer product of Example 5.
Figure 9:
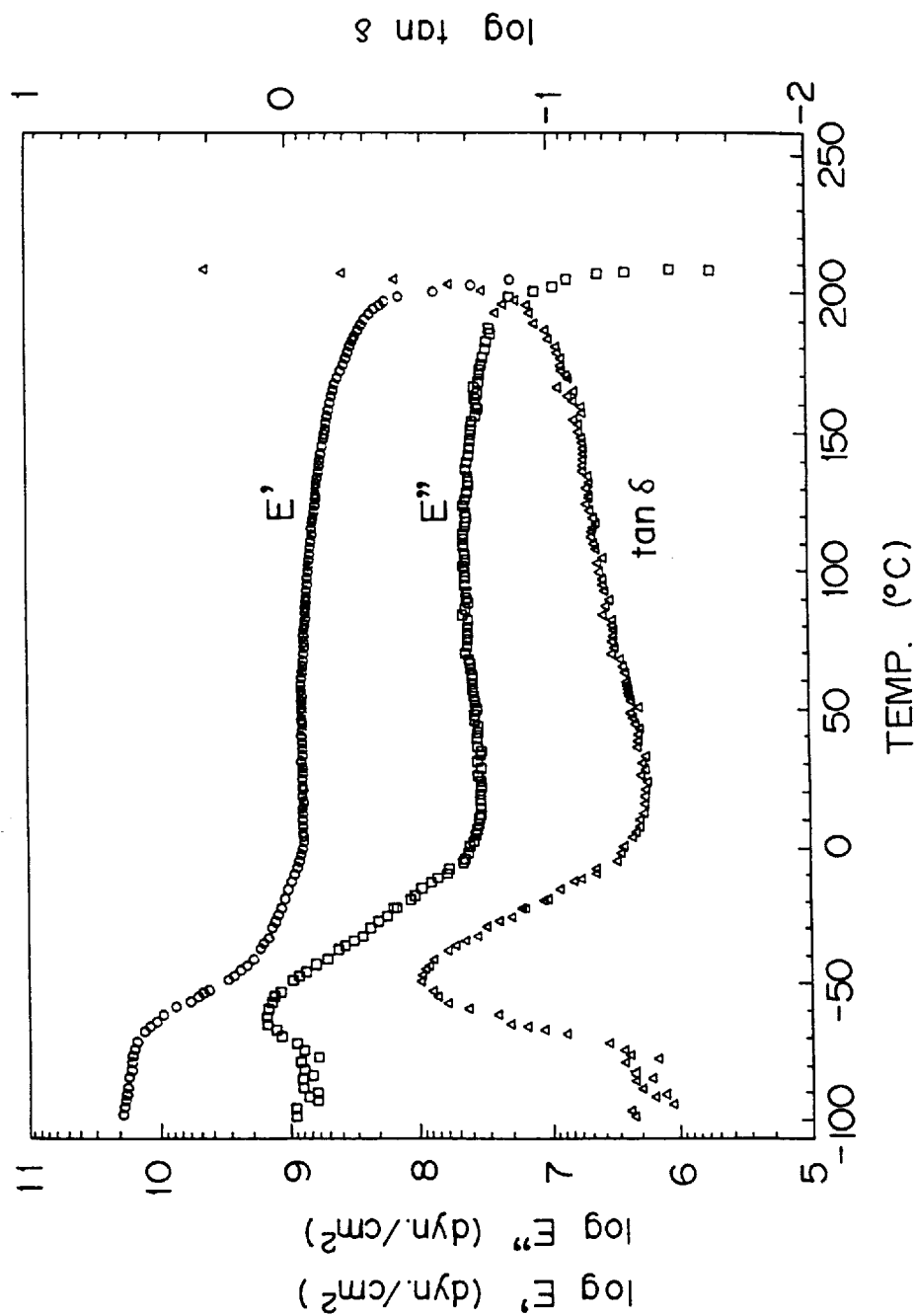
FIG. 9 is a graph showing the kinetic viscoelastic behavior of the esteramide copolymer product of Example 5.

The $^1$H-NMR and $^{13}$C-NMR charts and kinetic viscoelasticity characteristics determined on the product are shown in FIGS. 7, 8 and 9, respectively. The copolymer had an Mw of 37,000, a glass transition temperature (Tg) of −79° C., a melting point (Tm) of 218° C. and a thermal decomposition temperature (Td) of 403° C. The copolymer exhibited the following mechanical properties:

| | |
|---|---|
| hardness (Hs) | 91 (JIS-A) |
| breaking strength ($T_B$) | 231 kg/cm$^2$ |
| elongation at break ($E_B$) | 690% |

EXAMPLE 6 a 500 ml-capacity four-neck separable flask provided with a nitrogen inlet pipe, a thermal sensor, a magnetic stirrer blade and a distillation tube was charged with 100.88 g (0.05 moles) PTMG (Mn=2,014) and 19.37 g (0.10 moles) BAB and flushed thoroughly with nitrogen gas. Then, 0.08 g tetrabutyl titanate catalyst was introduced. Under a nitrogen stream, the temperature of the reaction mixture was raised from room temperature upto 200° C. over a period of 60 minutes with stirring. A calculated amount of eliminated butanol was permitted to flow out in 2 hours. Then the mixture was allowed to react at 230° C. and a reduced pressure of 1 mm Hg for a further 2 hours.

Thereafter, 200 ml of NMP was added to the mixture, which was then maintained ice-cooled. To the cooled mixture a solution of 10.16 g (0.05 moles) TPC in 100 ml NMP was added dropwise. Also, 7.95 g (0.10 mole) pyridine was added as a hydrogen chloride-scavanger to the mixture which was then allowed to polymerize for one day at room temperature.

After polymerization, the resulting polymer product was precipitated using a bulk of methanol, filtered and dried to give an esteramide copolymer showing good rubber elasticity. The yield was 105.03 g (88%).

The copolymer had the following physical and mechanical properties:

| | |
|---|---|
| Mw | 41,000 |
| Tg | −85° C. |
| Tm | 198° C. |
| Td | 401° C. |
| Hs | 78 (JIS-A) |
| $T_B$ | 181 kg/cm$^2$ |
| $E_B$ | 890% |

EXAMPLE 7

A 100 ml-capacity separable flask provided with a nitrogen inlet pipe, a thermal sensor, a stirrer and a distiller was 29.935 g polytetramethylene glycol (M.W.=1,031), 15 g diamidodicarboxylate diester (a) from Reference Example 1 and 0.1 g IRGANOX1010 and vacuum-dried at 100° C. Then, 0.1404 g tetrabutyl titanate catalyst and 7 ml NMP (13.9% by weight of the total weight of the glycol and ester employed) were added to the flask. The mixture was heated to 190° C. and allowed to react at this temperature for 3.5 hours. Then the temperature was raised to 250° C. over a period of 60 minutes under incremental vacuum so as to remove substantially all the solvent. A sample of the resulting prepolymer at this stage showed a number average molecular weight of 4,200. Any butanol eliminated from the reaction was also removed together with the solvent during said vacuum distillation.

Figure 10:
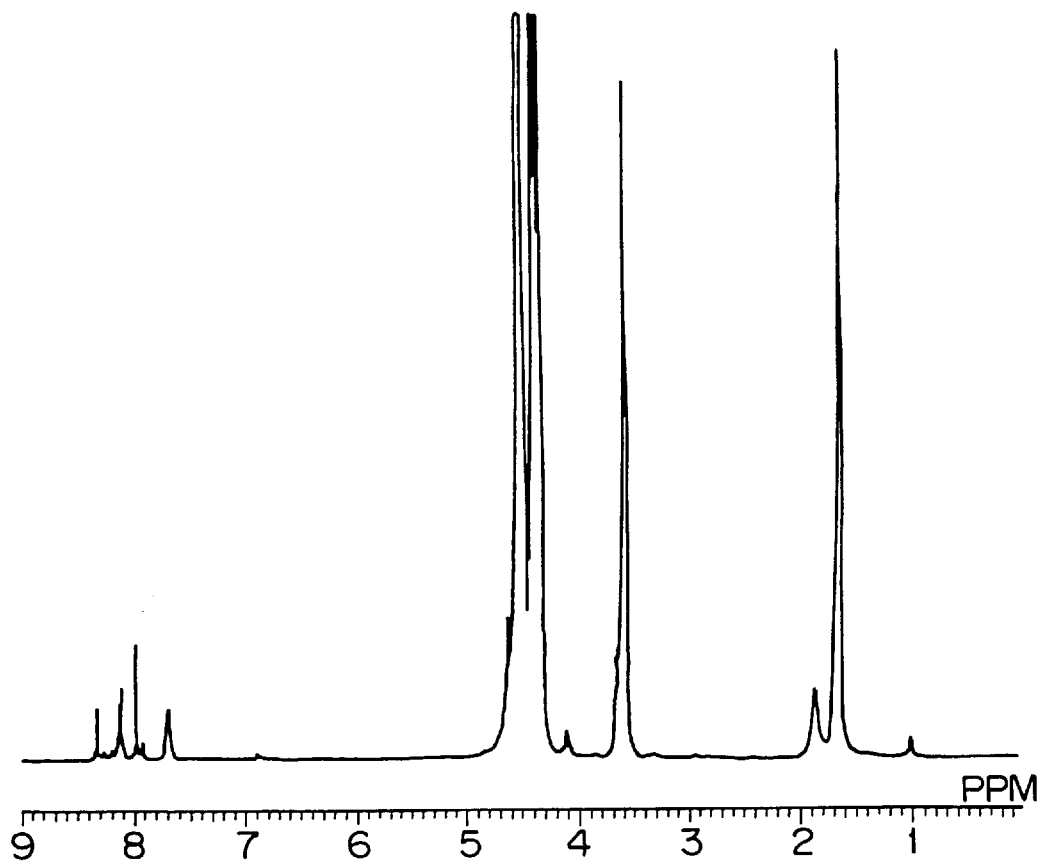
FIG. 10 is an $^1$H-NMR chart for the elastomer product of Example 7.
Figure 11:
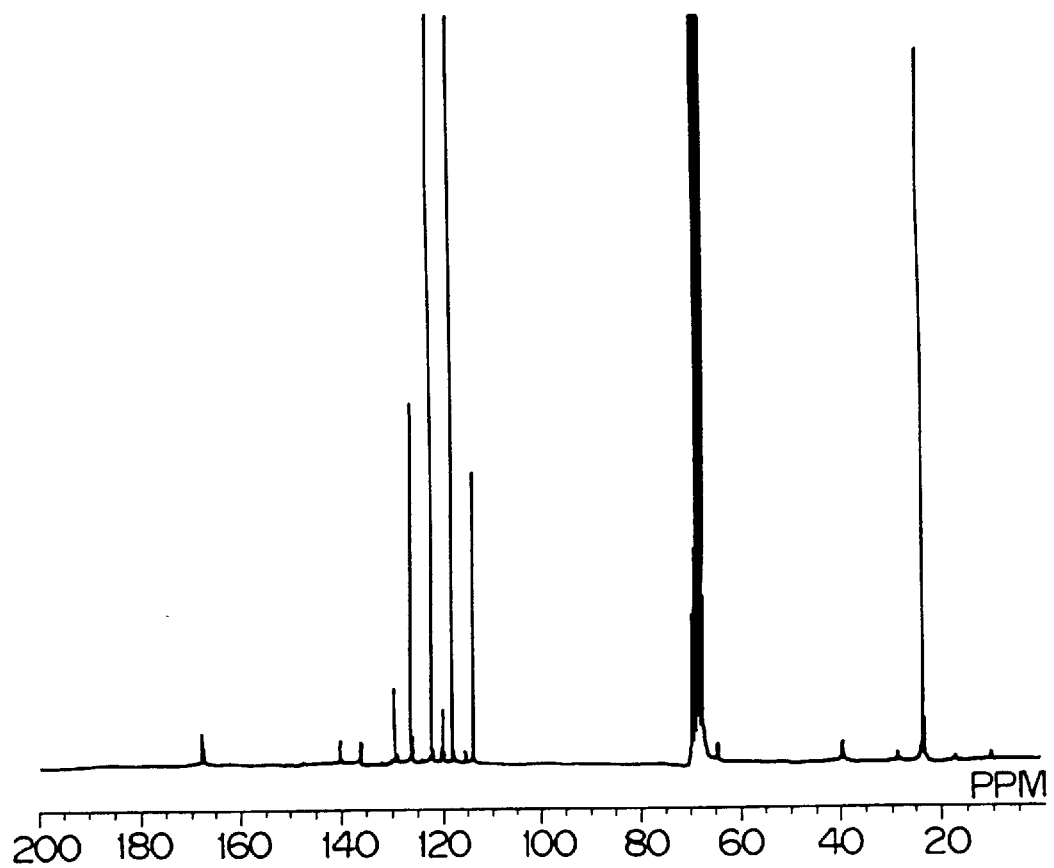
FIG. 11 is a $^{13}$C-NMR chart for the elastomer product of Example 7.
Figure 12A:
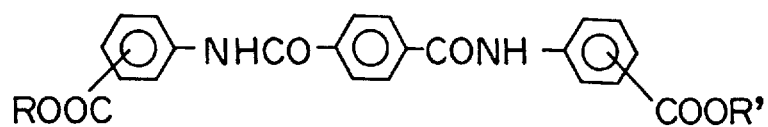
FIGS. 12A and 12B show a list of typical examples of the aromatic diamidodicarboxylate diester compounds which may be used as one of the starting materials for synthesis of the copolymers of the invention.
Figure 12A:
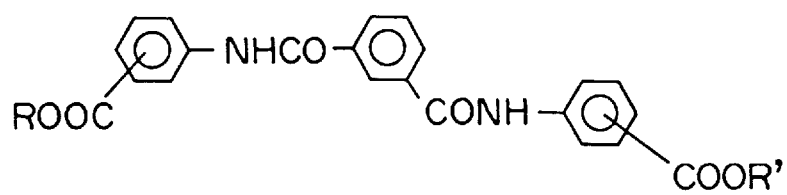
Figure 12A:
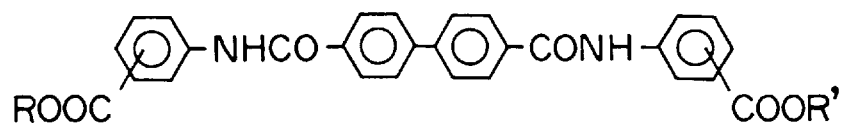
Figure 12A:
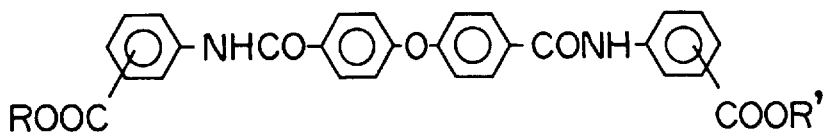
Figure 12A:
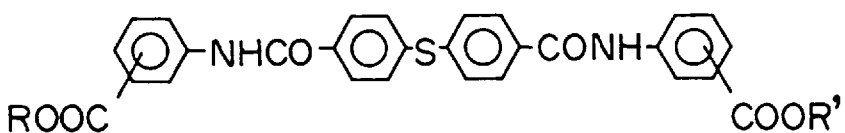
Figure 12B:
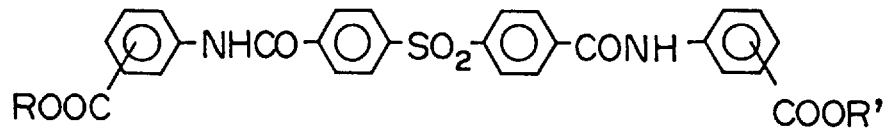
Figure 12B:
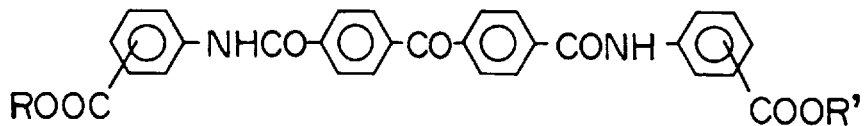
Figure 12B:
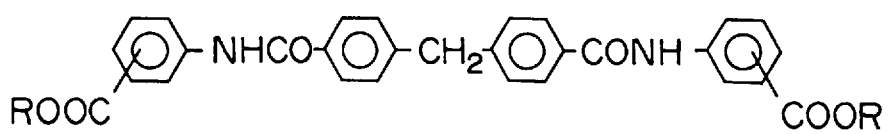
Figure 12B:
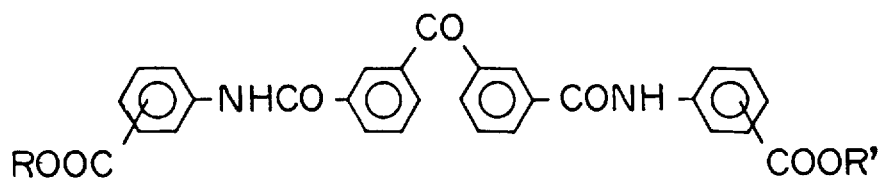
Figure 12B:
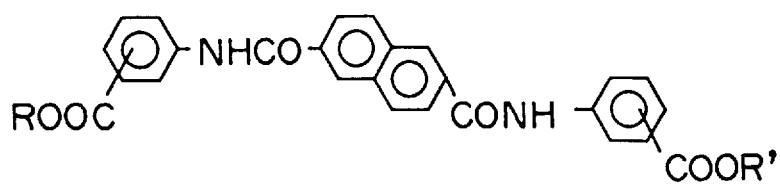
Figure 12B:
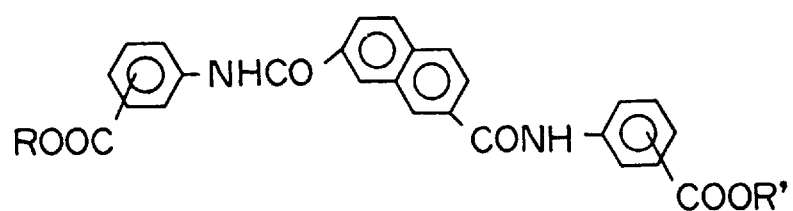

Thereafter, the reaction mixture was allowed to react at 250° C. and a reduced pressure of 1 mm Hg for a further 4 hours to produce a highly viscous pale yellow polymer, which was withdrawn under nitrogen. The resulting polymer had a Z mean molecular weight of 55,200 as calculated as polystyrene, when determined by the GPC method. The polymer showed on Mz/Mw ratio of 8.95 and a breaking strength of 105 kg/cm$^2$. The $^1$H-NMR and $^{13}$C-NMR charts of the polymer are shown in FIGS. 10 and 11, respectively.

EXAMPLES 8–10

The procedure of Example 7 was reacted except that various proportions of NMP were used. The results are set forth in Table 2.

EXAMPLE 11

A 15 liter-capacity autoclave provided with a nitrogen inlet pipe, a thermal sensor, a spiral stirring blade and a distillation column was charged with 1,796 g (3.9 moles) oligoesteramide (c) prepared by the procedure as described in Reference Example 3, 3,963 g (3.9 moles) PTMG (Mn= 1,016) and 5.7 g IRGANOX1010 (a phenolic stabilizer; Ciba-Geigy AG). After thorough flushing with nitrogen gas, the autoclave was further charged with 2,468 g NMP and 6.6 g tetrabutyl titanate catalyst. Under a nitrogen stream, the temperature of the reaction mixture was raised from room temperature upto 210° C. over a period of 60 minutes and a calculated amount of eliminated ethanol was permitted to flow out in 0.5 hours. The NMP was removed under vacuum in 1.5 hours. The solvent-depleted mixture was raised to 240° C. and allowed to polymerized in the molten stated for one hour. An esteramide copolymer showing good rubber elasticity was obtained at a yield of 5,400 g (95%). The molecular weight, glass transition temperature (Tg), melting point (Tm) and mechanical properties (Hs, $T_B$ and $E_B$) are shown in Table 3.

EXAMPLE 12

A 15 liter-capacity autoclave provided with a nitrogen inlet pipe, a thermal sensor, a spiral stirring blade and a distillation column was charged with 1,381 g (3.0 moles) oligoesteramide (c) as used in the preceding Example, 4,542 g (3.0 moles) PTMG (Mn=1,514) and 5.9 g IRGANOX1010 (a phenolic stabilizer; Ciba-Geigy AG). After thorough flushing with nitrogen gas, the autoclave was further charged with 2,676 g NMP and 7.1 g tetrabutyl titanate catalyst. Under a nitrogen stream, the temperature of the reaction mixture was raised from room temperature to 210° C. over a period of 60 minutes and a calculated amount of eliminated ethanol was permitted flow out in 0.5 hours. Under vacuum, the NMP was removed in 1.5 hours. Then the mixture was heated to 240° C. and allowed to polymerize in the molten state for one hour. An esteramide copolymer showing good rubber elasticity was obtained at a yield of 5,420 g (96%).

The molecular weight, glass transition temperature (Tg), melting point (Tm) and mechanical properties (Hs, $T_B$ and $E_B$) are shown in Table 3.

EXAMPLE 13

A 15 liter-capacity autoclave provided with a nitrogen inlet pipe, a thermal sensor, a spiral stirring blade and a distillation column was charged with 1,105 g (2.4 moles) oligoesteramide (c) as used in Examples 11 and 12, 5,033 g (2.4 moles) PTMG (Mn=2,097) and 6.1 g IRGANOX1010 (a phenolic stabilizer; Ciba-Geigy AG) and thoroughly flushed with nitrogen gas. The autoclave was further charged with 3,023 g NMP and 8.2 g tetrabutyl titanate catalyst. Under a nitrogen stream, the temperature of the reaction mixture was raised from room temperature upto 210° C. over a period of 60 minutes and a calculated amount of ethanol was permitted to flow out in 0.5 hours. The NMP was removed under vacuum in 1.5 hours. Then the temperature was raised to 240° C. and the solvent-depleted mixture was allowed to polymerized in the molten state for one hour. An esteramide copolymer showing good rubber elasticity was produced at a yield of 5,562 g (94%). The molecular weight, glass transition temperature (Tg), melting point (Tm) and mechanical properties (Hs, $T_B$ and $E_B$) of the polymer are shown in Table 3.

As above-illustrated, according to the invention, esteramide copolymers are provided, which are of a nature of thermoplastic elastomer material and contain aromatic oligoesteramide chains as hard segment in their macromolecules. It should be noted that the copolymers are prepared under a precise control of the sequence in which the respective monomeric materials are admitted into the macromolecular structure. Therefore, the excellent heat resistance, cold resistance, processability, strength and moldability properties and other desirable properties may be advantageously developed in the copolymers according to the invention.

TABLE 1

Analysis of Esteramide Copolymers

| Examples | Thermal analysis | | | Molecular weight (× 10⁻⁴) | | | Elementary analysis (%) | | | | | |
|---|---|---|---|---|---|---|---|---|---|---|---|---|
| | | | | | | | C | | H | | N | |
| | Tg(°C.) | Tm(°C.) | Td(°C.) | Mn | Mw | Mw/Mn | calculated | found | calculated | found | calculated | found |
| 1 | −74 | 209 | 401 | 1.4 | 2.7 | 1.9 | 68.0 | 67.9 | 9.1 | 9.3 | 2.0 | 1.9 |
| 2 | −74 | 194 | 400 | 1.5 | 3.3 | 2.2 | 67.7 | 67.7 | 9.6 | 9.6 | 1.1 | 1.0 |
| 3 | −80 | 204 | 401 | 1.2 | 2.1 | 1.8 | 67.4 | 67.1 | 9.9 | 9.5 | 1.2 | 1.1 |
| 4 | −69 | 94 | 403 | 2.3 | 5.2 | 2.3 | 68.0 | 68.5 | 9.1 | 9.2 | 2.0 | 1.9 |

TABLE 2

| Examples | Added NMP (wt %) | Polymer yield (%) | Mz (/10⁵) | Mz/Mw | Breaking strength (kg/cm²) |
|---|---|---|---|---|---|
| 7 | 7 ml (13.9) | 98 | 5.52 | 8.95 | 105 |
| 8 | 15 ml (17.2) | 94 | 8.64 | 8.28 | 108 |
| 9 | 20 ml (20.0) | 98 | 7.26 | 10.13 | 111 |
| 10 | 25 ml (31.5) | 99 | 6.82 | 9.66 | 124 |

TABLE 3

Physical and mechanical properties

| Examples | Tg (°C.) | Tm (°C.) | Mn (×10⁻⁴) | Mw (×10⁻⁴) | Hs (JIA-A) | $T_B$ (Kg/cm²) | $E_B$ (%) |
|---|---|---|---|---|---|---|---|
| 11 | −77 | 225 | 6.5 | 11.1 | 95 | 255 | 990 |
| 12 | −79 | 210 | 6.1 | 11.6 | 90 | 299 | 1090 |
| 13 | −80 | 196 | 6.3 | 12.3 | 84 | 388 | 1110 |

What is claimed is:

1. An esteramide copolymer produced by the process which comprises the steps of:

reacting (a) a diester compound of an aromatic diaminodicarboxylic acid of the formula:

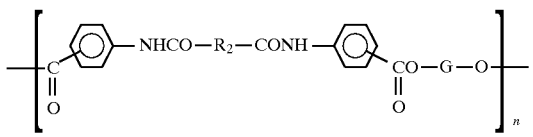

with (b) a poly(alkylene oxide) glycol having a number average molecular weight of about 250–10,000 in the presence of an organic solvent so as to form a prepolymer having a number average molecular weight of less than 12,000, said solvent having a boiling point of about 140°–290° C. at atmospheric pressure and being capable of dissolving said (a) diester compound of said aromatic diaminodicarboxylic acid, said prepolymer resulting from said reaction between said (a) diester compound of said aromatic diaminodicarboxylic acid, and said (b) glycol or said diester compound of said aromatic diaminodicarboxylic acid and said prepolymer to an extent of at least about 0.01 g per ml at 25° C.;

removing the solvent from the reacted mixture to form a residue; and subjecting the thus recovered residue to bulk polymerization in the molten phase to thereby form an esteramide copolymer having a number average molecular weight of 61,000–500,000 and which consists of units represented by the general formula:

$$\left[ \underset{\mathrm{O}}{\overset{\mathrm{C}}{\|}} - \bigcirc - \mathrm{NHCO} - \mathrm{R}_2 - \mathrm{CONH} - \bigcirc - \underset{\mathrm{O}}{\overset{\mathrm{CO}}{\|}} - \mathrm{G} - \mathrm{O} \right]_n$$

wherein R and R' each independently represent an aliphatic alkyl group having 1–13 carbon atoms, $R_2$ represents a divalent aromatic group, G represents a residue of said (b) poly(alkylene oxide) glycol having a number average molecular weight of about 250–10,000 and n is a whole number.

2. The esteramide copolymer as claimed in claim 1 wherein the reacting to form the prepolymer is at a temperature of about 140°–220° C. and at or near atmospheric pressure for about 0.5–6 hours in the presence of a polymerization catalyst and, after the removing of the solvent which is conducted under vacuum, the resulting residue is further subjected to the bulk polymerization at a temperature of about 210°–270° C. and at a reduced pressure of about 0.1–2 mm Hg for a period of about 1–6 hours to give a desired copolymer product.

3. The esteramide copolymer as claimed in claim 1 wherein the solvent comprises an organic amide solvent.

4. The esteramide copolymer as claimed in claim 1 wherein said (a) diester compound is selected from the group consisting of

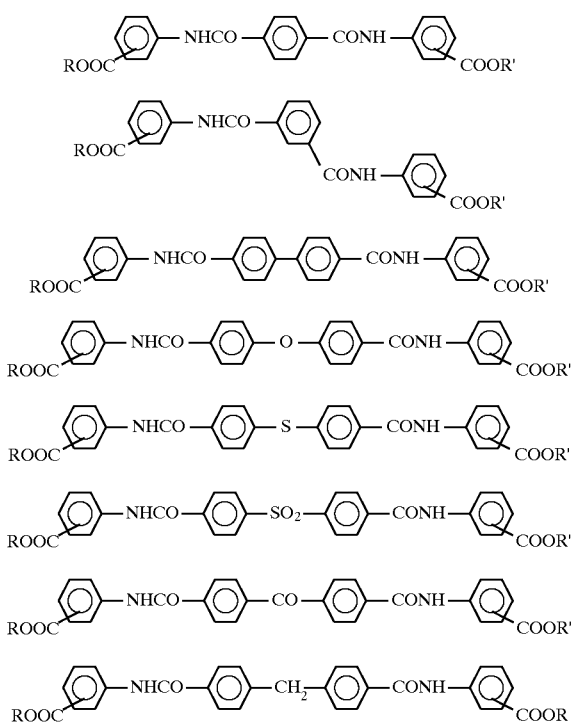

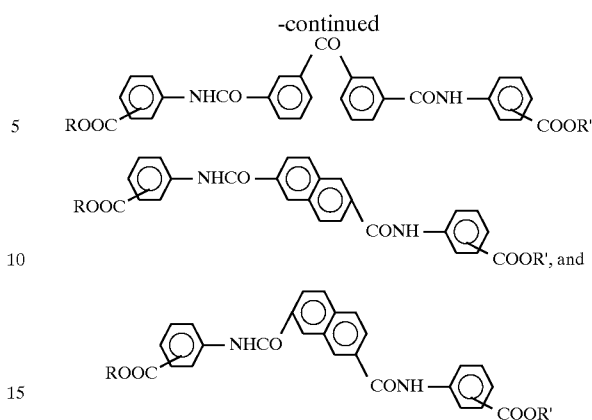

and said (b) poly(alkylene oxide) glycol is selected from the group consisting of poly(ethylene oxide) glycol, poly(propylene oxide) glycol, poly(tetramethylene oxide) glycol, poly(hexamethylene oxide) glycol, ethylene oxide/propylene oxide copolymer, ethylene oxide/tetrahydrofuran copolymer, polypropylene oxide) glycol/ethylene oxide adduct polymer, poly(ethylene oxide)-poly (tetramethylene oxide) diblock copolymer, poly (ethylene oxide)-poly (tetramethylene oxide)-poly (ethylene oxide) triblock copolymer, and mixtures thereof.

* * * * *